July 17, 1951

A. VAN RYAN ET AL 2,560,831

CIRCUIT INTERRUPTER

Filed March 28, 1945

INVENTORS
ANTHONY VAN RYAN
CARL SCHINDLER

BY

*Anton R. Woofter*
ATTORNEY.

Fig. 2

Patented July 17, 1951

2,560,831

UNITED STATES PATENT OFFICE 2,560,831

CIRCUIT INTERRUPTER

Anthony Van Ryan, South Milwaukee, and Carl Schindler, Wauwatosa, Wis., assignors to Mc-Graw Electric Company, a corporation of Delaware Application March 28, 1945, Serial No. 585,238

8 Claims. (Cl. 200—89)

This invention relates to an automatic reclosing circuit interrupter.

It has been found that most faults or shorts on distribution systems are of a temporary nature and that approximately eighty five per cent of these cases will permit immediate restoration of service after the fault is once cleared. Also, at least half of the remaining fifteen per cent of the cases will permit restoration of the service if the fault is cleared a second time, the remaining seven and one half per cent of the faults usually being of a permanent nature.

Objects of this invention are to provide a circuit interrupter which is so made that it will have one or more quick circuit interrupting operations followed by one or more slow circuit interrupting operations provided the overload continues or, in other words, which is so made that it has two time current characteristics and may be coordinated with fuses in branch lines following the circuit interrupter.

Further objects are to provide a circuit interrupter which is oil immersed, which has hydraulic means for securing the two time current characteristics, which has hydraulic time delay means for delaying the closing of the circuit interrupter, which has its contacts arranged to open and close with a quick motion, which will lock out after a predetermined number of operations occurring in rapid succession, which will automatically reset itself for its full number of operations if the number of operations occurring in rapid succession are less than the predetermined number or are widely spaced in time, which may be manually reset and manually tripped, which is free for automatic operation even while it is being manually reset, and which will indicate when it is locked out.

Further objects are to provide a circuit interrupter which is precise and reliable in its operation, which has hydraulic means for pumping a predetermined quantity of liquid into a counting cylinder, which has the pumping means distinct and separate from means for delaying the closing of the circuit interrupter, and which is so arranged that it may be easily so changed that all of its operations may be rapid if so desired though the circuit interrupter is primarily designed to have two time current characteristics.

This invention is an improvement over that disclosed in our co-pending application Serial Number 527,724 filed March 23, 1944, for Automatic reclosing circuit breaker, and has generally the same objects as those set forth in such application.

An embodiment of the invention is shown in the accompanying drawings in which.

The circuit interrupter is housed within a tank 1 of metal which is preferably provided with an interior fibre lining 2 throughout the major portion of its extent. The tank 1 is covered by a metal cap or cover 3 detachably secured thereto by means of nuts and bolts indicated respectively at 4 and 5 in Figures 5 and 6. Suitable gaskets are provided between the cap or cover 3 and the body 1 of the tank and preferably gaskets are provided beneath the nuts 5 in accordance with the usual practice.

Figure 2:
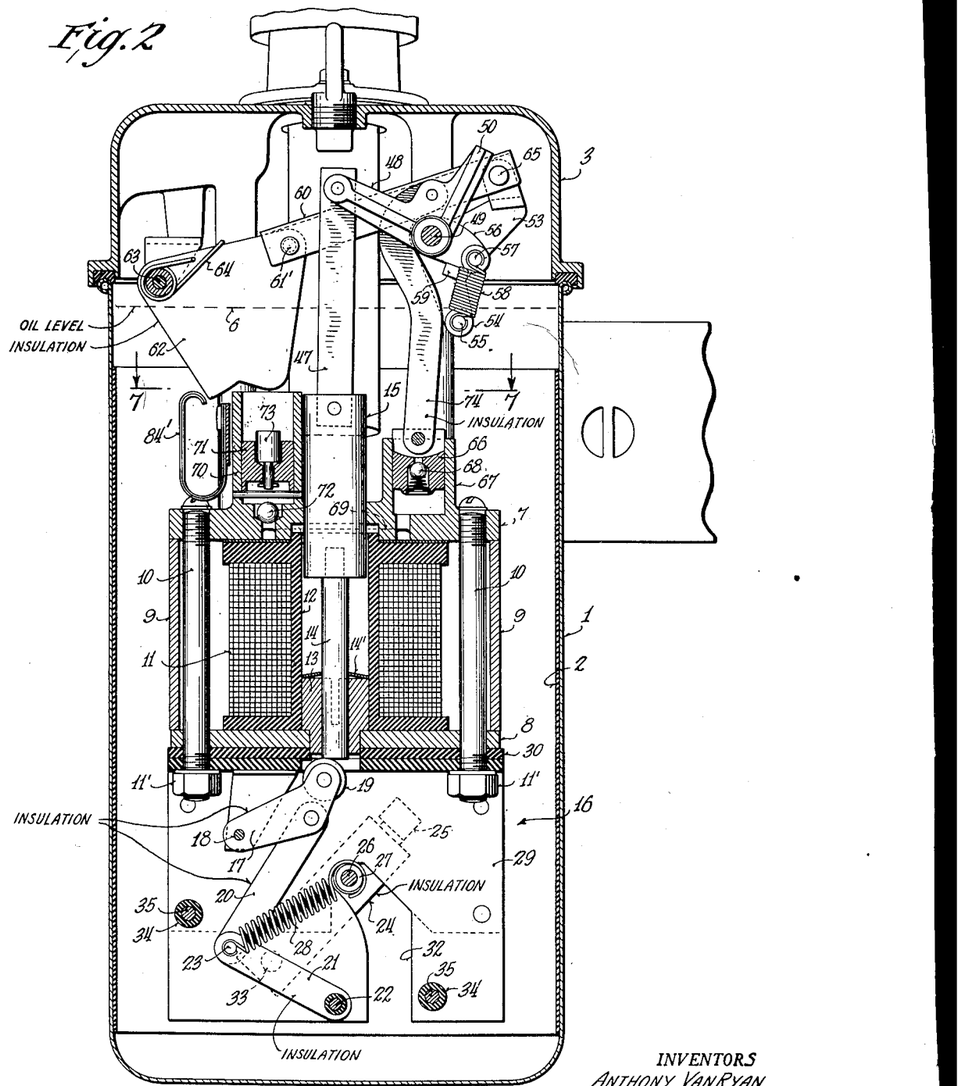
Figure 2 is a sectional view on a line 2—2 of Figures 1 and 4, showing the circuit interrupter in circuit closed position.

The entire mechanism of the circuit interrupter is suspended from the cover 3 by insulating pillars and the major portion of the circuit interrupter mechanism is oil immersed, the oil level being indicated by the reference character 6 in Figure 2.

The circuit interrupter comprises a magnetic body portion which consists of a top magnetic member 7, see Figure 2, and a bottom magnetic member 8 which are spaced apart by means of magnetic side members 9. The members 7 and 8 are held in contact with member 9 by means of the bolts 10 threaded into the member 7 and receiving the nuts 11' at their lower ends. Between the members 7 and 8 a magnetic coil or solenoid 11 is positioned and is wound about an insulating cylinder or tube 12 which is preferably provided with insulating end flanges.

The lower member 8 is provided with a magnetic plug 13 which is apertured and receives the non-magnetic plunger or extension 14 of the magnetic plunger 15. It is preferable to partially slot the magnetic plug 13 to reduce eddy currents and if desired a cushioning spring dished washer 14' may be provided to cushion the final portion of the stroke of the magnetic plunger or armature 15.

The switch assembly is indicated generally by the reference character 16 and is adapted to be applied or removed as a unit. It has no permanent mechanical connection with the plunger 14, but is operated by means of the plunger. This switch assembly comprises a power transmitting member 17 which consists of a pair of insulating levers pivoted as indicated at 18 and carrying between their outer free ends a hardened metal roller 19 against which the plunger 14 is adapted to bear. The power transmitting member or lever 17 is connected by means of an insulating link 20 with a lever 21 composed of a pair of insulating members pivoted as indicated at 22. The free end of the lever 21 is connected by means of a pin 23 with a link 20.

The switch arms consist of a pair of insulating arms or members 24 located on the outside of the switch assembly and provided with movable contact members 25. These movable contact members are electrically joined by means of the metallic rod 26 extending completely through the switch assembly and sheathed by means of an insulating sleeve 27 as shown most clearly in Figures 4 and 10. The insulating sleeve 27 is slightly grooved and receives the eyeletted ends of tension springs 28 which extend therefrom to the pin 23 of the lever 21, the pin 23 being also preferably grooved and receiving the other eyeletted ends of the tension springs 28.

The switch assembly is preferably formed of a U-shaped insulating member 29 which is spaced from the main body portion of the magnetic structure by means of an insulating plate 30 and which is held in place by means of the bolts 10. Preferably the outer ends of the insulating plate 30 are up-turned slightly as shown in Figure 4 to provide additional protection for various parts of the leads as is apparent from an examination of Figure 4.

Figure 4:
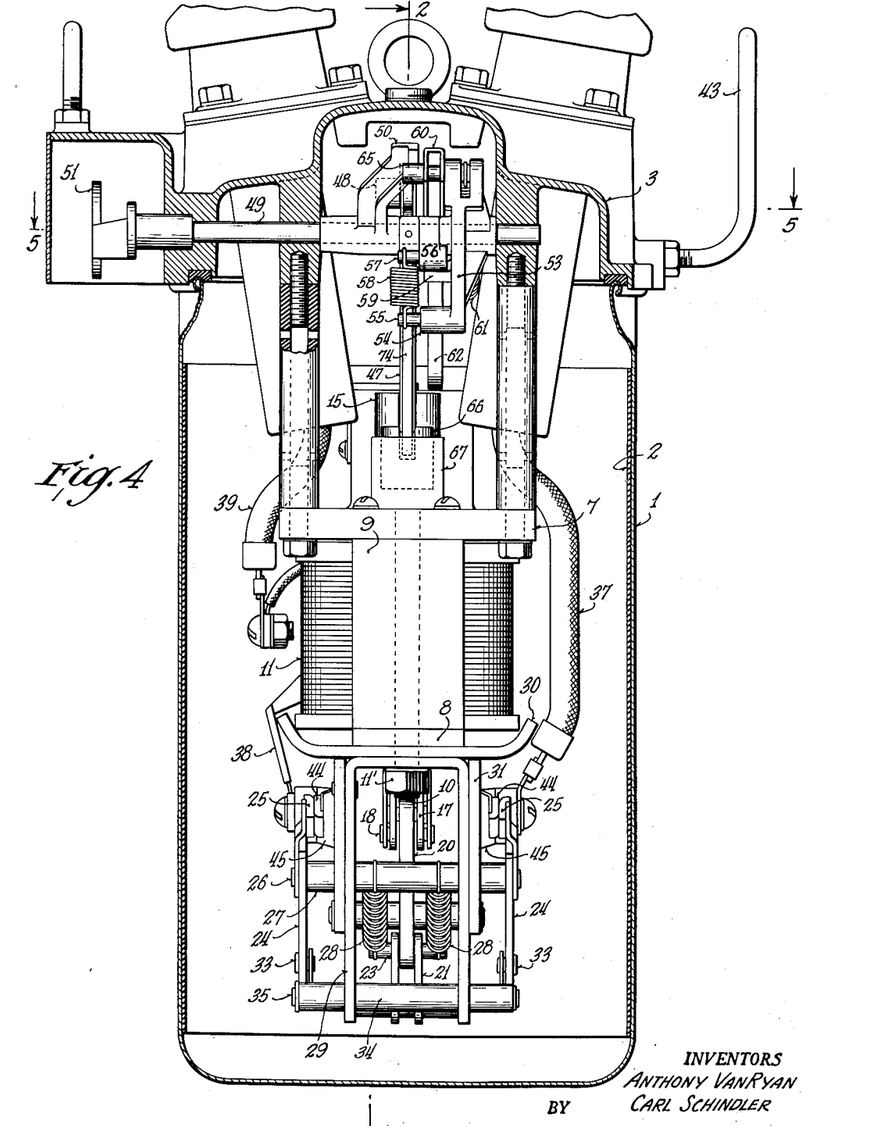
Figure 4 is a sectional view approximately on a line 4—4 of Figure 5.

If desired these side plates of the U-shaped insulating member 29 may be strengthened by reinforcing insulating plates 31 as shown in Figure 4, such plates being held in place by means of rivets or in any other suitable manner. The side plates of the U-shaped insulating member as well as the reinforcing plates 31 are slotted as indicated at 32 in Figure 2 so as to provide a clearance space for the pin 26 and its insulating sheath 27.

It is apparent that when the solenoid or coil 11 is energized to a sufficient extent that the plunger 15 is drawn downwardly and in so doing rocks the power transmitting member 17 downwardly and correspondingly rocks the lever 21 downwardly. This carries the pivot pin 23 at the end of the tension springs 28 across the pivot points 33 of the switch arms 24 and consequently cause the switch arms to rock downwardly with a quick stroke. It is to be noted that the parts are so arranged that at the time the line of pull of the tension springs 28 crosses dead center with reference to the switch arms 24 that the roller 19 which is being driven downwardly at a very rapid rate, as the plunger is nearing completion of its stroke, strikes the sleeve 27 which is rigid with the switch arm and starts the switch arms toward open position with a quick stroke, the tension springs 28 continuing or even increasing the speed of opening of the switch. It is to be noted that the slotted upper end of the plunger 15 allows trapped oil beneath the plunger to be suddenly discharged near the end of the stroke of the plunger, thus increasing the speed of the plunger at this portion of the stroke.

Figure 3:
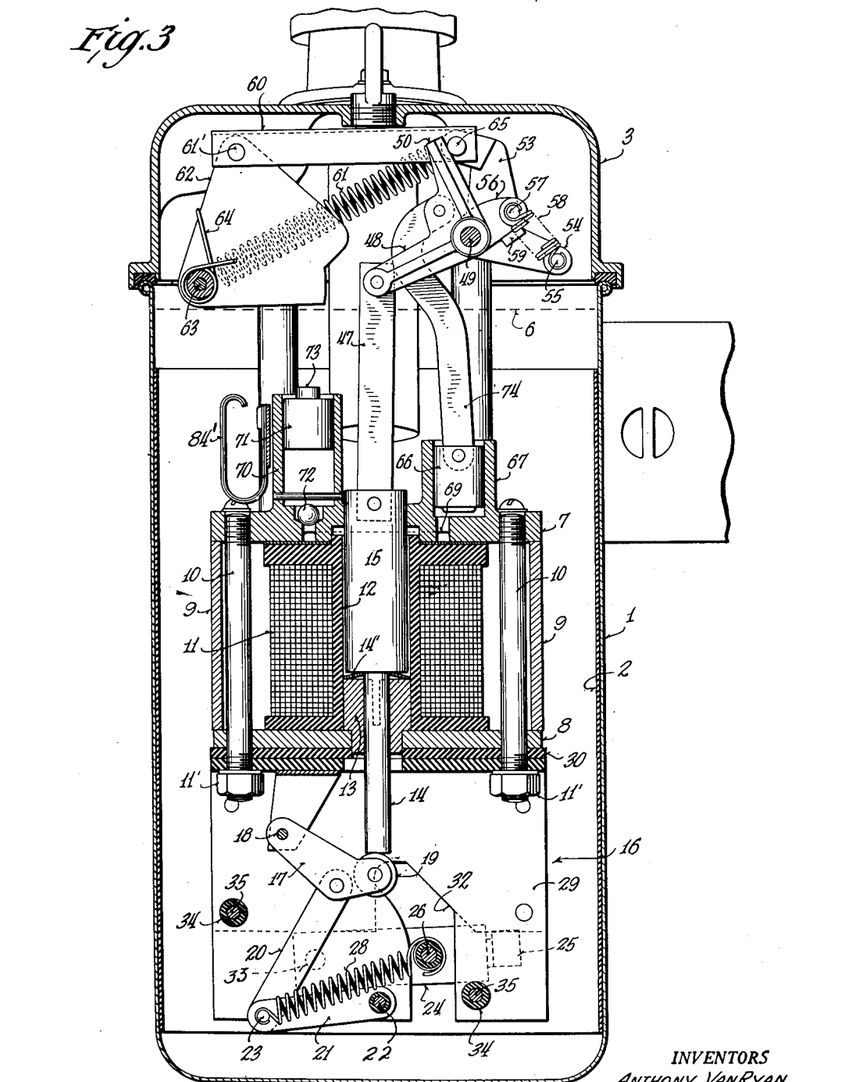
Figure 3 is a view corresponding to Figure 2 showing the circuit interrupter in open circuit position and locked out.

The side arms of the U-shaped insulating member 29 are braced by means of insulating sleeves 34 surrounding pins 35 which are riveted to the insulating arms 29. One of the sleeves 34 acts as a stop for the switch arms as is apparent from an examination of Figure 3. It is to be noted that when the circuit interrupter is in circuit open position no current passes through the energizing coil 11 as this coil is connected in series with the switch. Consequently the electromagnet is deenergized and the plunger 15 rises due to the action of the tension springs 28. This is apparent when Figure 3 is considered for it will be seen that the line of pull of the springs 28 is above the pivot point 22 of the lever 21 and consequently such springs act to raise the plunger. The plunger continues to move upwardly and the line of pull of the springs 28 crosses the pivot point 33 of the switch arms and consequently the switch arms are rocked to closed position with a quick motion, irrespective of the speed of travel of the plunger. This mechanism is more fully described in our above noted co-pending application.

Figures 1, 12:
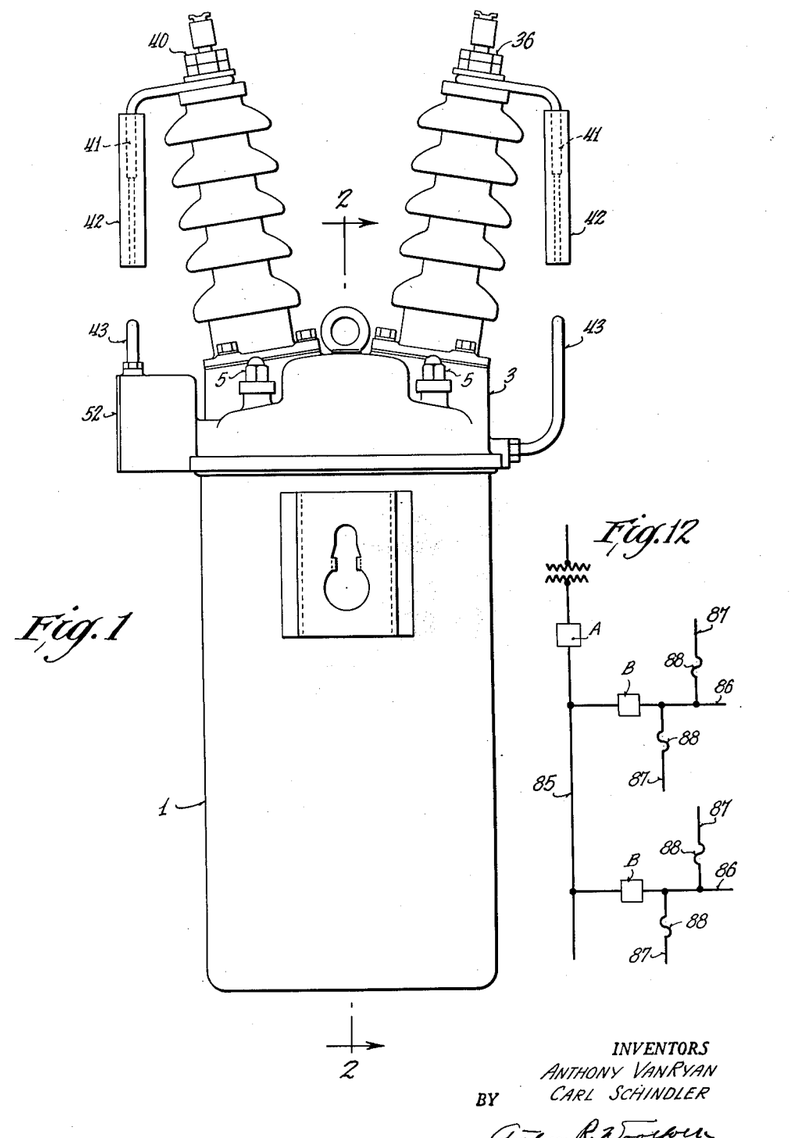
Figure 1 is a side elevation of the circuit interrupter.
Figure 12 is a diagrammatic view showing the manner in which the circuit interrupter is connected in the distribution system.
Figure 5:
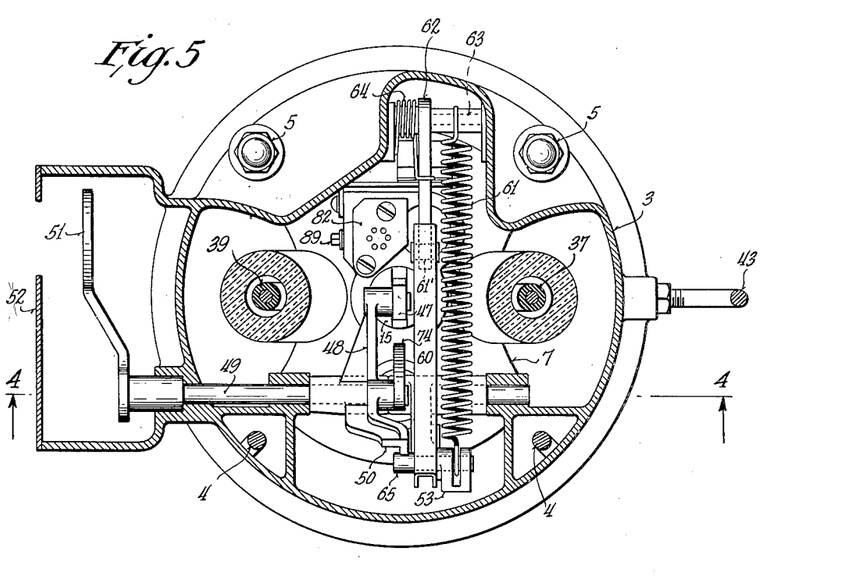
Figure 5 is a sectional view on a line 5—5 of Figure 4.

Referring now to Figures 1, 4 and 5 it will be seen that the line terminal is indicated by the reference character 36 and is connected to one of the stationary contacts by means of the conductor 37, see Figure 4. The other stationary contact is connected by means of the conductor 38 with one side of the coil 11, the other side of the coil being connected by means of the conductor 39 with a load terminal 40, see Figure 1. Preferably the load and line terminals are provided with downwardly extending electrodes 41 which are housed within downwardly opening fiber tubes 42 whose lower ends are spaced from upwardly extending grounded electrodes 43.

Figure 9:
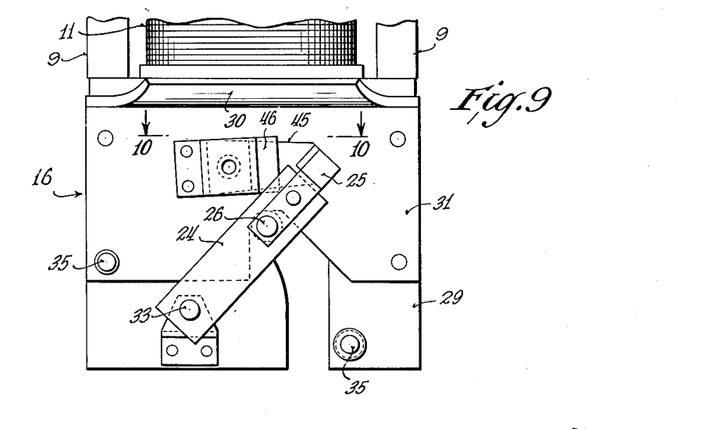
Figure 9 is a fragmentary view of the lower portion of the circuit interrupter showing the circuit interrupter in circuit closed position.
Figure 10:
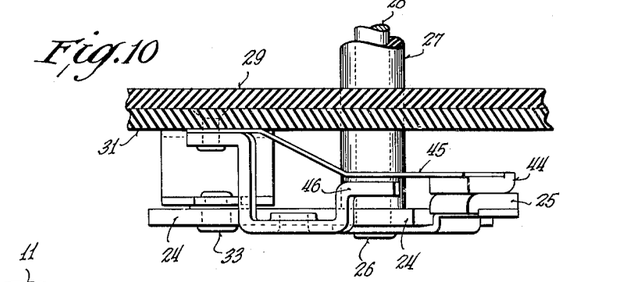
Figure 10 is a sectional detail on a line 10—10 of Figure 9.
Figure 11:
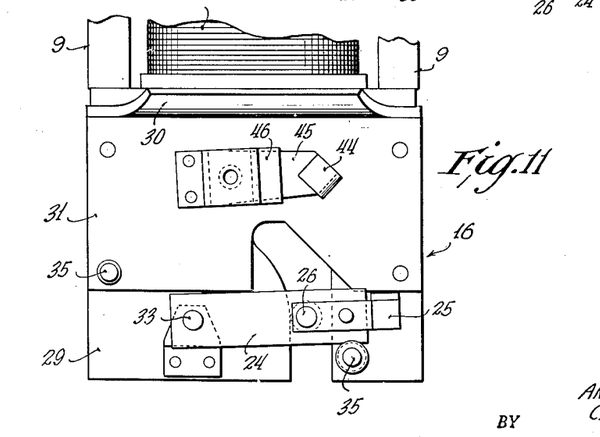
Figure 11 is a view corresponding to Figure 9 showing the parts in position they occupy when the circuit interrupter is in circuit open position.

The stationary contacts are shown most clearly in Figures 9, 10 and 11, and are indicated by the reference character 44. These stationary contacts are carried by leaf springs 45 whose outward motion is limited by means of the bracket members 46, the bracket members 46 being electrically connected to the contacts 44 as shown in Figure 10 and being adapted to be connected to the conductors 37 and 38, see Figure 4, by means of bolts, screws or in any other suitable manner.

The upper portion of the magnetic plunger 15 is slotted and pivotally receives the lower end of an insulating link 47. The upper end of the insulating link 47 is connected to one arm 48 of a bell crank lever loosely pivoted upon the shaft 49. The other end of the bell crank lever is indicated by the reference character 50, see Figure 2. The shaft 49 is journalled in the cap or cover 3 as shown most clearly in Figure 4, and extends outwardly therefrom and is provided with an eyeletted manipulating handle or lever 51 normally housed within a hood-like portion 52 integral with the cover 3 as shown most clearly in Figure 6. This manipulating handle or lever is adapted to be operated by a switch stick in a manner hereinafter described for resetting the circuit interrupter or for manually tripping it. It is also effective as an indicator to indicate when the circuit interrupter is in locked out position, the locked out indicating position of the handle being shown in dot and dash lines in Figure 6.

A second bell crank lever having arms 53, 54 is loosely mounted on shaft 49 and is provided at one end with a pin 55. A small arm or lever 56 is rigidly mounted on the shaft 49 and is provided with a pin 57. A tension spring 58 is positioned between the pins 57 and 55 and normally holds lever 56 in the position shown in Figure 2 against a shouldered portion 59 formed on the arm 54 of the last mentioned bell crank lever.

The upper end of the bell crank lever 53, 54 pivotally receives one end of a downwardly opening channel shape link 60. The other end of the link is pivoted at 61' to the insulating strip member 62 which is pivoted as indicated at 63 and is spring urged downwardly by means of a spring 64. A relatively heavy tension spring 61 is positioned between the pivot pin 63 of the trip member 62 and the pivot pin 65 which joins the arm 53 and the link 60 as shown most clearly in Figures 3 and 5. The construction is such that the channel shaped link 60 and trip member 62 constitute a toggle link mechanism which is normally slightly below dead center as shown in Figure 2 and is prevented from moving downwardly beyond this position due to the fact that the link 60 extends slightly beyond the pivot point 61' and bears against the upper face of the trip member 62 and thus limits further downward motion.

It is apparent that when the trip member 62 is rocked upwardly in a counter-clockwise direction it breaks the toggle link mechanism and the spring 61 contracts and rocks the toggle link mechanism to the position as shown in Figure 3. In doing this the pin 65, which is extended laterally of the link 60, engages the arm 50 and rocks the arm 48 of the bell crank lever downwardly thus thrusting the plunger 15 downwardly and opening the circuit interrupter or holding the circuit interrupter in open position in the event the tripping has occurred manually or automatically, respectively.

It is apparent that when the plunger 15 moves downwardly it merely rocks the bell crank lever 48, 50 in a counter-clockwise direction and does not have any effect on the small lever 56 rigid with the shaft 49 as such small lever is held by means of its spring 58 in engagement with the shoulder 59 of the bell crank lever 53, 54. However, when the circuit interrupter is locked out, the bell crank lever 53, 54 rocks in a counter-clockwise direction from the position shown in Figure 2 to that shown in Figure 3 and rocks the small lever 56 counter-clockwise and thus moves the manipulating handle 51, see Figure 6, from its hidden or housed position to its exposed or indicating position.

Figure 6:
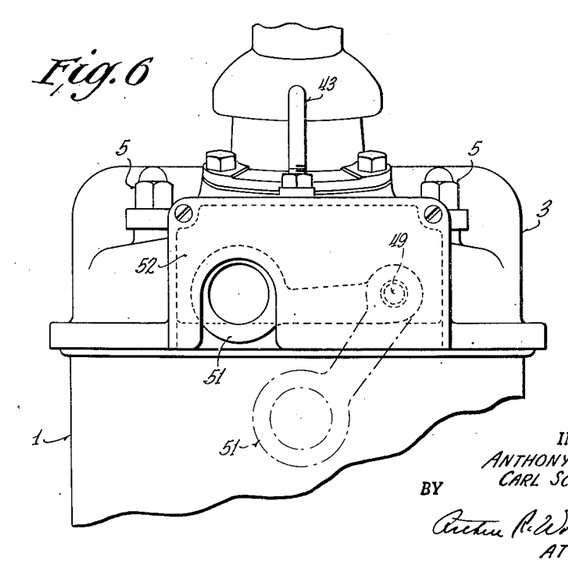
Figure 6 is a fragmentary view of the top portion of the circuit interrupter with parts broken away showing the manually operable lever in full lines in its normal position and in dotted lines in its locked out position.

It is apparent that when a switch stick is inserted in the eyelet of the manipulating handle 51, see Figure 6, and is pulled downwardly that the shaft 49 is rocked in a counter-clockwise direction and carries this small lever 56 upwardly, the spring 58 being extended. This upward motion of the lever 56 has no effect on the bell crank lever 53, 54. However, as the lever 56 approaches its uppermost position, it engages beneath the link 60 of the toggle link mechanism and breaks the toggle link mechanism thus causing the circuit interrupter to open with a quick stroke.

Figure 8:
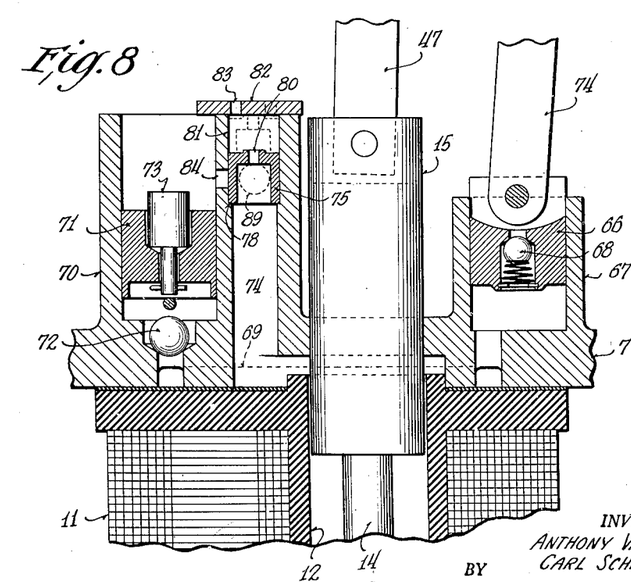
Figure 8 is a sectional view on a line 8—8 of Figure 7.

Means are also provided for automatically tripping the circuit interrupter so that it will automatically lock out after a predetermined number of operations. This mechanism is hydraulically operated. It consists of a pumping piston 66 operating in a pumping cylinder 67. The piston 66 is provided with a check valve 68 which allows oil to enter on the up-stroke of the piston. The lower portion of the pumping cylinder 67 connects by means of a channel 69 with the lower portion of a counting cylinder 70 within which a counting piston 71 is slidably positioned. An upwardly opening check valve 72 is interposed between the passage 69 and the counting cylinder 70 as shown in Figures 2 and 8. The counting piston 71 is provided with a weighted valve 73 to allow a slow resettling of the counting piston. The weight of the valve 73 and the size of its upper portion as well as the clearance and size of its lower extension is such that during the sudden down stroke of the pumping piston 66 the clearance between the reduced downward extension of the valve 73 and the hole through the piston will act to restrict the flow of oil for the brief interval of the pumping stroke of the piston 66 and the pressure built up below the piston 71 will act primarily on the reduced extension of the valve 73 while the piston is being raised. However, during resettling, oil pressure in spite of the restrictions hereinabove mentioned slowly builds up beneath the part of the enlarged valve 73 and raises the valve with reference to the piston 71 and allows the piston to slowly settle. The piston 66 is operated by means of an insulating link 74 which connects the piston with the bell crank lever 48 and 50 so that the piston 66 operates once for each down stroke of the plunger 15. The heighth to which the piston 71 will rise for each stroke of the piston 66 is determined by the relative sizes of the pumping and counting cylinders 67 and 70.

It is apparent from the description thus far given that when the piston 71 has arrived at a predetermined point the upper end thereof, that is to say the upper end of the weighted valve 73, will strike the tripping member 62 and will break the toggle and cause the circuit interrupter to remain in its open position and thus lock the circuit interrupter in open position due to the action of the relatively powerful spring 61, see Figure 3.

It is to be noted that the plunger 15 acts as a piston within the tube or cylinder 12 and on the down stroke of the plunger 15 pumps a certain amount of oil upwardly around the piston into the passage 74, see Figure 8. There is considerable clearance between the plunger 15 and the cylinder or tube 12 so that the oil freely passes out of this space into the passage 74. A slide valve 75 is provided which normally rests on the shouldered portion 78. It is provided with a small aperture 80 in its upper portion. The slide valve 75 constitutes in effect a small piston which operates within the cylinder 81, such cylinder 81 constituting an extension of the passageway 74. The upper end of the cylinder 81 is closed by means of a plate 82 provided with apertures 83. It is to be noted that a discharge aperture 84 is provided between the cylinder 81 and the counting cylinder 70 and that the upper end of the counting cylinder is open.

It is apparent, therefore, that when the plunger 15 is drawn downwardly on overload, that oil displaced by the plunger 15 raises slide valve 75 upwardly and discharges through the discharge passage or outlet 84. At the same time the pump 66 operates and raises the counting piston 71 a predetermined amount. It is intended in the form of invention chosen for illustration that the plunger 15 shall make two quick strokes before the counting piston 71 closes the discharge aperture 84. When the counting piston 71 closes the discharge aperture 84 the piston 15 is delayed on subsequent down strokes as the oil displaced by the piston 15 has to pass upwardly leaking around the piston where it passes through the upper magnetic member 7. Consequently after two operations of the circuit interrupter the downward stroke of the piston 15 will be retarded and a delayed opening of the circuit interrupter will result. The construction is such in the form of invention chosen for illustration that the plunger 15 will make two slow down strokes before the piston 71 will trip the trip lever member 62. The construction is such that on the last stroke of the plunger 15 the valve 73 of the counting piston 71 will engage the lower portion of the tripping member 62 and will prevent escape of fluid through the counting piston 71 thus causing a powerful thrust to be imparted to the tripping member 62.

It is to be noted further that when the slide valve 75 is in its uppermost position the aperture 80 therethrough is sealed as such aperture is closed by the plate 82 and consequently when the slide valve 75 is at the upper end of its stroke no fluid can escape through the aperture 80 of the slide valve.

The aperture 80 of the slide valve 75 constitutes a restricted opening through which oil may flow during the upward travel of the plunger 15 since the slide valve 75 closes the opening 84 on the first portion of the upward stroke of the plunger 15. This causes a delayed closing of the circuit interrupter after each circuit interrupting operation.

It is to be understood that when the pumping piston 66 no longer furnishes oil to the counting piston 71 that the counting piston 71 slowly settles downwardly and the oil below such piston slowly leaks past the weighted valve 73. This resetting of the counting piston has a dual function. In the first place after lock out occurs, the counting piston will reset itself so that no thought is required on the part of the operator when he manually resets the interrupter. The slow settling of the counting piston 71 has an additional purpose. The circuit interrupter locks out on its fourth operation when such operations occur in rapid sequence. If on the other hand a lesser number than four operations has occurred the counting piston would slowly settle downwardly and would reset itself by arriving at its lowest position so that it would require the full predetermined number of operations before lock out would occur for subsequent operations.

If desired a bimetal thermostatic member 84' may be provided, see Figure 2, and is adapted to trip member 62 when the oil within the circuit interrupter arrives at a predetermined temperature.

It is to be noted that the circuit interrupter even during manual resetting is free to operate. For instance, during manual resetting the small lever 56 is rocked from the position shown in Figure 3 to that shown in Figure 2 and rocks the bell crank lever 53, 54 in a clockwise direction. This merely moves the pin 65 away from the arm 50 of the bell crank lever 48, 50 and allows the plunger 15 to rise. If, however, when the circuit interrupter closes an overload still exists the plunger 15 is free to make a quick down stroke and open the switch mechanism though the operator may still be in the process of resetting the circuit interrupter.

The circuit interrupter has two time current characteristics: one when the discharge passage 84 is open, the other when the discharge passage 84 has been closed by the counting piston 71. When the discharge passage 84 is open the plunger 15 can execute a quick down stroke. When the discharge passage 84 is closed the plunger 15 is delayed in its downward stroke and consequently the circuit interrupter has a different time current characteristic. This is highly important in a system of distribution when the circuit interrupter is followed by one or more fuses. For example, Figure 12 shows a system of distribution. In this system a repeating circuit interrupter A is provided between the source of power and the main line 85. A plurality of branch lines 86 extend from the main line 85 and interposed therebetween are circuit interrupters B forming the subject matter in this invention. These branch lines 86 supply a plurality of sub-branch lines 87, fuses 88 being interposed therebetween. If desired the repeating circuit interrupter A may be the same type of repeating circuit interrupter B as described hereinabove, or if desired the circuit interrupter A may be a different type of circuit interrupter.

Assume that a fault occurs on one of the sub-branch lines 87, the circuit interrupter B of the corresponding branch line 86 will immediately open and will protect the fuse 88 from blowing. Circuit interrupter B is arranged to open very quickly, prior to the blowing of the fuse 88. If the fault clears nothing further happens when the circuit interrupter closes, but if the fault persists the circuit interrupter will execute a second quick opening stroke. On again reclosing if the fault still persists the circuit interrupter B will have a delayed opening and consequently the fuse 88 of the sub-branch line 87 where the fault occurs will blow thus isolating such sub-branch line. The service of the other sub-branch lines controlled by the circuit interrupter B hereinabove described will be maintained. Thus the circuit interrupters B are co-ordinated with the fuses 88.

Figure 7:
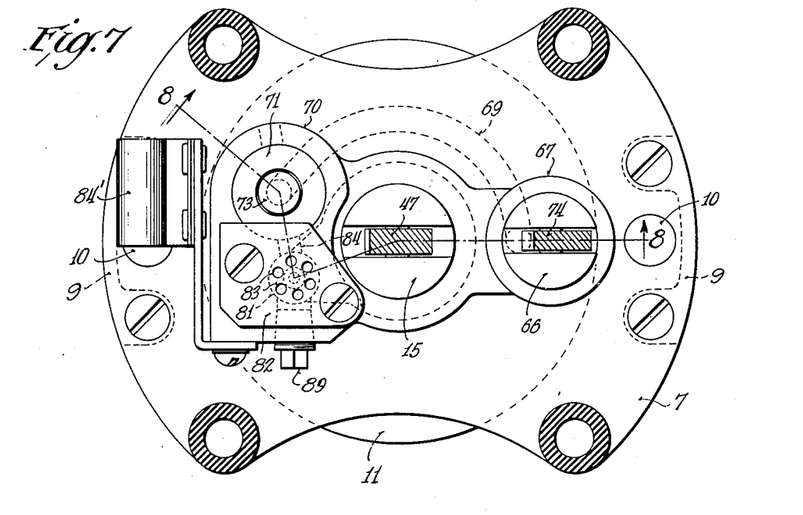
Figure 7 is a sectional view approximately on a line 7—7 of Figure 2.

It occasionally happens that a purchaser wishes to have a quick action for all operations of the circuit interrupter. This is readily obtained by merely removing the screw plug 89, see Figures 7 and 8. This provides a permanently open discharge passage for the oil displaced by the plunger 15 and thus allows all opening operations of the circuit interrupter to be rapid. The cumulative hydraulic action of the lock out or tripping piston is not disturbed as it is operated by means of the pumping piston 66 independently of any displacement of oil by the piston 15. Consequently although the circuit interrupter may be adjusted as described above so that all opening operations are rapid, nevertheless it still retains its lock out features.

It is to be noted that the main plunger 15 and its cylinder 12 constitute the first hydraulic means. This hydraulic means is normally ineffective to delay the downward or opening motion of the plunger 15. It is to be noted further that the piston 66 and its cylinder 67 constitute the second hydraulic means which is so arranged that it renders the first hydraulic means, hereinabove described, effective to delay the plunger 15. This delay is occasioned by the pumping of the second hydraulic means 66, 67 into the space beneath the counting piston 71 so as to cause the piston 71 to close off the opening 84 after a predetermined number of strokes of the main piston 15.

It will be seen that a circuit interrupter has been provided by this invention which has two time current characteristics in its normal operation so that it operates one or more times in a rapid manner to open the circuit on overload and thereafter is followed by one or more delayed operations in the event the overload still persists.

It will be seen also that the circuit interrupter due to the above characteristics may be readily co-ordinated with fuses or other circuit interrupting devices in a distribution system where these devices follow the circuit interrupter and protect either branch lines or sub-branch lines as hereinabove set forth.

It will be seen further that the circuit interrupter is very easily produced and is not dependent for its action upon delicate or easily damaged parts but is reliable and precise in its operation.

Although this invention has been described in considerable detail it is to be understood that such description is intended as illustrative rather than limiting, as the invention may be variously embodied and is to be interpreted as claimed.

We claim:

1. A repeating circuit interrupter comprising switch means, electromagnetic means for opening said switch means on overload, said circuit interrupter having at least a first quick opening operation on overload, means for closing said switch means, normally ineffective hydraulic means including a cylinder having a vent and a plunger in said cylinder operatively connected to said switch means for delaying the opening of said switch means, a second hydraulic means independent of said first mentioned hydraulic means having means for restricting said vent to thereby render said first mentioned hydraulic means effective to delay the opening of said switch means on continued overload after at least one first quick opening of said circuit interrupter, and pumping means driven from said electromagnetic means for advancing said second hydraulic means towards vent-closing position.

2. A repeating circuit interrupter comprising switch means, electromagnetic means for opening said switch means on overload, said circuit interrupter having at least a first quick opening operation on overload, means for closing said switch means, normally ineffective hydraulic means including a cylinder having a vent and a plunger operatively connected to said switch means for delaying the opening of said switch means, a second hydraulic means including a pump mechanically connected with said electromagnetic means and independent of said first mentioned hydraulic means, and vent restricting means operated by said pump for rendering said first mentioned hydraulic means effective to delay the opening of said switch means after at least one first quick opening of said circuit interrupter.

3. A repeating circuit interrupter comprising switch means, electromagnetic means for opening said switch means on overload, said circuit interrupter having at least a first quick opening operation on overload, a spring biasing said switch means towards closed position, normally ineffective hydraulic means including a cylinder having a vent and a plunger operatively connected to said switch means for delaying the opening of said switch means, a second hydraulic means distinct and separate from said electromagnetic means and including a pump mechanically connected to said electromagnetic means, and vent restricting means operated by said pump for rendering said first mentioned hydraulic means effective on continued overload after at least one quick operation of said circuit interrupter.

4. A repeating circuit interrupter comprising switch means, electromagnetic means for opening said switch means and including normally ineffective hydraulic delay means provided with pumping means having a normally freely effective discharge outlet and means providing a leak for said pumping means, means for closing said switch means, hydraulic means including pumping means distinct and separate from said first mentioned pumping means, and a counting piston actuated from said last mentioned pumping means and having discharge outlet controlling means for closing said discharge outlet.

5. A repeating circuit interrupter comprising switch means, electromagnetic means for opening said switch means and including normally ineffective hydraulic delay means provided with pumping means having a normally freely effective discharge outlet and means providing a leak for said pumping means, means for closing said switch means, hydraulic means including pumping means distinct and separate from said first mentioned pumping means, and a counting piston actuated from said last mentioned pumping means and having discharge outlet controlling means for closing said discharge outlet, said second mentioned hydraulic means including means for reopening said discharge outlet after a predetermined interval of time.

6. A repeating circuit interrupter comprising switch means, electromagnetic means for opening said switch means on overload, means tending to close said switch means, hydraulic means for retarding the closing of said switch means, said hydraulic means having a discharge opening controlling the delay in opening said switch means, a counting piston, said counting piston including means for restricting said discharge opening, and a second hydraulic means independent of said first mentioned hydraulic means for advancing said counting piston for restricting said discharge opening.

7. A repeating circuit interrupter comprising switch means, electromagnetic means having an armature for opening said switch means on overload, hydraulic means including a discharge opening for delaying the switch opening motion of said armature, a counting piston having means for restricting said discharge opening after a predetermined number of operations of said circuit interrupter, and pumping means for advancing said counting piston, said pumping means being independent of said hydraulic means and being driven from said armature.

8. A repeating circuit interrupter comprising switch means, electromagnetic means including a plunger for opening said switch means on overload, normally ineffective hydraulic means for delaying the switch opening stroke of said plunger, said hydraulic means including a discharge opening, a slide valve normally closing said discharge opening and adapted to open said discharge opening when said plunger moves towards switch open position, said slide valve having a restricted aperture therethrough for controlling the rate of return of said plunger to its initial position, means tending to close said switch means and move said plunger to its initial position, and means actuated from said plunger for closing said discharge opening after a predetermined number of operations of said circuit interrupter.

ANTHONY VAN RYAN.
CARL SCHINDLER.

REFERENCES CITED

The following references are of record in the file of this patent:

UNITED STATES PATENTS

| Number | Name | Date |
|---|---|---|
| 508,652 | Thomson | Nov. 14, 1893 |
| 1,288,017 | Johnson | Dec. 17, 1918 |
| 1,648,508 | Schweitzer | Nov. 8, 1927 |
| 1,893,348 | Anderson | Jan. 3, 1933 |
| 2,069,082 | Walle | Jan. 26, 1937 |
| 2,311,714 | Thompson et al. | Feb. 23, 1943 |
| 2,379,729 | Lincks | July 3, 1945 |